United States Patent [19]

Zhao

[11] Patent Number: 5,794,192
[45] Date of Patent: *Aug. 11, 1998

[54] SELF-LEARNING SPEAKER ADAPTATION BASED ON SPECTRAL BIAS SOURCE DECOMPOSITION, USING VERY SHORT CALIBRATION SPEECH

[75] Inventor: Yunxin Zhao, Santa Barbara, Calif.

[73] Assignee: Panasonic Technologies, Inc., Princeton, N.J.

[*] Notice: The term of this patent shall not extend beyond the expiration date of Pat. No. 5,664,059.

[21] Appl. No.: 712,802

[22] Filed: Sep. 12, 1996

Related U.S. Application Data

[63] Continuation of Ser. No. 55,075, Apr. 29, 1993.

[51] Int. Cl.$^6$ .................................. G10L 5/06; G10L 7/08
[52] U.S. Cl. .................. 704/244; 704/240; 704/242; 704/254
[58] Field of Search .................................. 704/240, 242, 704/244, 254

[56] References Cited

U.S. PATENT DOCUMENTS

| | | | |
|---|---|---|---|
| 4,363,102 | 12/1982 | Holmgren et al. | 364/513 |
| 4,903,305 | 2/1990 | Gillick et al. | 381/41 |
| 5,033,087 | 7/1991 | Bahl et al. | 381/43 |

OTHER PUBLICATIONS

Kubala, Francis et al. "Speaker Adaptation From a Speaker Independent Training Corpus," IEEE ICASSP, pp. 137–140, Apr. 1990.

Huang, X.D. and Lee, K.F., "On Speaker–Independent, Speaker–Dependent, and Speaker–Adaptive Speech Recognition," IEEE ICASSP, pp. 877–868, May 1991.

Rozzi, William A. and Stern, Richard M., "Speaker Adaptation in continuous Speech Recognition Via Estimation of Correlated Mean Vectors," IEEE ICASSP, pp. 865–868, May 1991.

Schmidbauer, O., Tebelskis, J., "An LVQ Based Reference Model for Speaker Adaptive Speech Recognition," IEEE ICASSP, pp. I–441–I444, Mar. 1992.

Furui, Sadaoki, "Unsupervised Speaker Adaptation Method Based on Hierarchical Spectral Clustering," ICASSP, pp. 286–289, May 1989.

Hunt, Melvyn, "Session S. Speech Communication III: Speech Recognition," J. Acoust. Soc. Am. Suppl. 1, vol. 69, Spring 1981, pp. S41–S42.

Matsumoto, Hiroshi, Wakita, Hisashi, "Vowel Normalization by frequency Warped Spectral Matching," Elsevier Science Publ. B.V., Speech Communication, vo. 5, 1986, pp. 239–251.

Cox, S.J., Bridle, J.S., "Unsupervised Speaker Adaptation by Probabilistic Spectrum Fitting," ICASSP, pp. 294–297, May 1989.

Cox, S.J., Bridle, J.S. "Simultaneous Speaker Normalization and Utterance Labelling Using Bayesian/Neural Net Techniques," IEEE ICASSP, pp. 161–164,Apr. 1990.

Lee, Chin–Hui et al., "A Study on Speaker Adaptation of Continuous Density HMM Parameters," IEEE ICASSP, pp. 145–148, Apr. 1990.

(List continued on next page.)

Primary Examiner—David R. Hudspeth
Assistant Examiner—Tãlivaldis Ivars Šmits
Attorney, Agent, or Firm—Harness, Dickey & Pierce, P.L.C.

[57] ABSTRACT

A speaker adaptation technique based on the separation of speech spectra variation sources is developed for improving speaker-independent continuous speech recognition. The variation sources include speaker acoustic characteristics, and contextual dependency of allophones. Statistical methods are formulated to normalize speech spectra based on speaker acoustic characteristics and then adapt mixture Gaussian density phone models based on speaker phonologic characteristics. Adaptation experiments using short calibration speech (5 sec./speaker) have shown substantial performance improvement over the baseline recognition system.

16 Claims, 4 Drawing Sheets

OTHER PUBLICATIONS

S. Furui, "Unsupervised Speaker Adaptation Method Based on Hierarchical Spectral Clustering", Proc. ICASSP, pp. 286–289, Glasgow, Scotland, May 1989.

Y. Zhao, H. Wakita, and X. Zhwang, An HMM Based Speaker–Independent Continuous Speech Recognition System, Proc. ICASSP, pp. 333–336, Toronto, Canada, May, 1991.

K.F. Lee, "Large Vocabulary Speaker–Independent Continuous Speech Recognition: The SPHINX System" PhD Dissertation, Carnegie Mellon Univ, CMU–CS–88–148, April, 1988, pp. 19–42.

RECOGNITION

SELF-LEARNING SPEAKER ADAPTATION BASED ON SPECTRAL BIAS SOURCE DECOMPOSITION, USING VERY SHORT CALIBRATION SPEECH

This is a continuation of U.S. patent application Ser. No. 08/055,075, filed Apr. 29, 1993, entitled NEW SPEAKER ADAPTATION TECHNIQUE USING VERY SHORT CALIBRATION SPEECH.

BACKGROUND OF THE INVENTION

The present invention relates generally to automated speech recognition techniques. More particularly, the invention relates to an improved speaker adaptation method capable of being used with very short calibration speech.

An inherent difficulty in statistical modeling of speaker-independent continuous speech is that the spectral variations of each phone unit come from different sources of speaker acoustic characteristics (contributed by speaker articulatory characteristics), speaker phonologic characteristics (contributed by speaker's dialect accents and idiosyncrasies) and contextual dependency of allophones. Since the statistical models need to cover the spectral variations caused by these speaker factors, the speaker-independent models are less efficient than speaker-dependent models for individual speakers in decoding phonetically relevant events. Furthermore, even a "high-accuracy" speaker-independent speech recognizer could work poorly for the "outlier" speakers or under a simple change of recording condition. Therefore it is important to develop efficient adaptation techniques to improve speaker-independent continuous speech recognition with negligible adaptation efforts taken from the users of the speech recognizers.

Recently, several studies were reported on incorporating speaker adaptation into speaker-independent continuous speech recognition. Although improvements of recognition accuracy have been achieved by several techniques, the costs of these improvements are still high: several minutes of adaptation speech are required from each speaker to obtain average word error reductions from 2% to 25%. A common weak point in these techniques seems to be that the variation sources of speech spectra are not well identified and hence, not effectively handled.

RELATED ART

Reference may be had to the following literature for a more complete understanding of the field to which this invention relates.

F. Kabala, R. Schwartz, and Chris Barry, "Speaker Adaptation from a Speaker-Independent Training Corpus," *Proc. ICASSP*, pp. 137–140, Albuq., N.M., April 1990;

X. Huang and K. Lee, "On Speaker-Independent, Speaker-Dependent, Speaker-Adaptive Speech Recognition," *Proc. ICASSP*, pp. 877–880, Toronto, Canada, May 1991;

W. Rozzi and R. Stern, "Speaker Adaptation in Continuous Speech Recognition via Estimation of Correlated Mean Vectors," *Proc. ICASSP*, pp. 865–868, Toronto, Canada, May 1991;

B. Necioglu, M. Ostendorf and R. Rohlicek, "A Bayesian Approach to Speaker Adaptation for the Stochastic Segment Model," *Proc. ICASSP*, pp. 1437–1440, San Francisco, Calif., March 1992;

O. Schmidbauer, J. Tebelskis, "An LVQ Based Reference Model for Speaker Adaptive Speech Recognition," *Proc. ICASSP*, pp. 1441–1444, San Francisco, Calif., March 1992;

S. Furui, "Unsupervised Speaker Adaptation Method Based on Hierarchical Spectral Clustering," *Proc. ICASSP*, pp. 286–289, Glasgow, Scotland, May 1989;

L. F. Lamel, R. H. Kassel and S. Seneff, "Speech Database Development: Design and Analysis of the Acoustic-Phonetic Corpus," *Proceedings of Speech Recognition Workshop* (DARPA), 1986;

Y. Zhao, "A Speaker-Independent Continuous Speech Recognition System Using Continuous Mixture Gaussian Density HMM of Phoneme-Sized Units," to appear on *IEEE Transactions on Speech and Audio*, July 1993;

Y. Zhao and H. Wakits, "Experiments with a Speaker-Independent Continuous Speech Recognition System on the TIMIT Database," *Proc. ICSLP*, pp. 697–700, Kobe, Japan, November 1990;

Y. Zhao, H. Wakita, X. Zhuang, "An HMM Based Speaker-Independent Continuous Speech Recognition System With Experiments on the TIMIT Database," *Proc. ICASSP*, pp. 333–336, Toronto, Canada, May 1991;

M. J. Hunt, "Speaker Adaptation for Word Based Speech Recognition Systems," *J. Acoust. Soc. Am.*, 69:S41–S42, 1981;

H. Matsumoto and H. Wakita, "Vowel Normalization by Frequency Warped Spectral Matching," *Speech Communication*, Vol 5, No. 2, pp. 239–251, June 1986;

S. J. Cox and J. S. Bridle, "Unsupervised Speaker Adaptation by Probabilistic Fitting," *Proc. ICASSP*, pp. 294–297, Glasgow, Scotland, May 1989;

S. J. Cox and J. S. Bridle, "Simultaneous Speaker Normalization and Utterance Labelling Using Bayesian/Neural Net Techniques," *Proc. ICASSP*, pp. 161–164, Albuq., N.M., April 1990;

C-H. Lee, C-H Lin, B-H Juang (1990), "A Study on Speaker Adaptation of Continuous Density HMM Parameters," *Proc. ICASSP*, Minneapolis, Minn., April 1990, pp.145–148.

SUMMARY OF THE INVENTION

In the present invention, statistical methods are used to handle the variation sources of speech spectra individually. The adaptation task is decomposed into two sequential steps: first, the speech spectra are normalized based on speaker acoustic characteristics; second, the parameters of phone models are adapted based on speaker phonologic characteristics, where the allophone contextual dependency is modeled for effective adaptation by using small amounts of adaptation speech. This two-step adaptation strategy resembles the hierarchical adaptation technique of S. Furui, "Unsupervised Speaker Adaptation Method Based on Hierarchical Spectral Clustering," *Proc. ICASSP*, pp. 286–289, Glasgow, Scotland, May 1989 in VQ-based isolated word recognition. The baseline speaker-independent continuous speech recognition system uses continuous mixture Gaussian densities in the hidden Markov models of phoneme-size speech units, where the mixture density parameters are estimated from allophone subsegments in the TIMIT database via a bottom-up merging algorithm, with the resultant mixture sizes in proportion to the sample size and dispersion of training data in individual phone units. Compared to the baseline, experiments on the TIMIT database and speech data collected in our laboratory have achieved significant reductions of word errors where only a few seconds of adaptation speech is taken from each speaker.

More specifically, a speaker adaptation technique based on the separation of speech spectra variation sources is developed for improving speaker-independent continuous speech recognition. The variation sources include speaker acoustic characteristics, and contextual dependency of allophones. Statistical methods are formulated to normalize speech spectra based on speaker acoustic characteristics and then adapt mixture Gaussian density phone models based on speaker phonologic characteristics. Adaptation experiments using short calibration speech (5 sec./speaker) have shown substantial performance improvement over the baseline recognition system. On a TIMIT test set, where the task vocabulary size is 853 and the test set perplexity is 104, the recognition word accuracy has been improved from 86.9% to 90.6% (28.2% error reduction). On a separate test set which contains an additional variation source of recording channel mismatch and with the test set perplexity of 101, the recognition word accuracy has been improved from 65.4% to 85.5% (58.1% error reduction).

DESCRIPTION OF THE PREFERRED EMBODIMENT

Acoustic Normalization

Figure 1A:
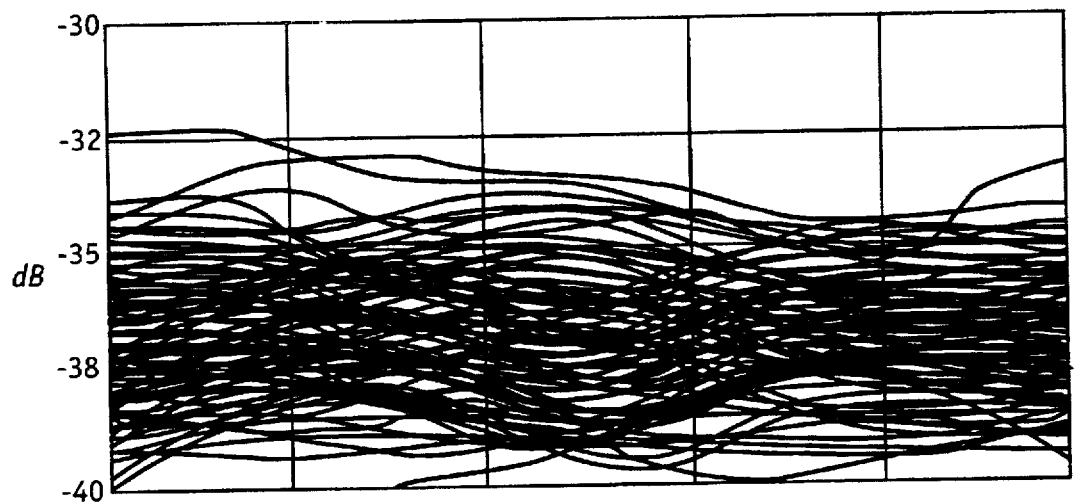
FIG. 1a is a graph depicting the spectral biases for speakers in the TIMIT test set.

The speech spectra from a speaker q are modeled as a linear transformation $H^{(q)}$ on those of a standard speaker o, where $H^{(q)}$ represents the articulatory characteristics of the speaker. In the logarithmic spectral domain, the speech spectrum $x_t^{(q)}$ from the speaker q is then a shift of the spectrum $x_t^{(o)}$ from the standard speaker by a bias vector $$h^{(q)} = \log H^{(q)}, \text{ i.e. } x_t^{(q)} = x_t^{(o)} + h^{(q)}$$

Previous research has also shown that spectral slope due to speaker glottal characteristics is one of the major factors causing inter-speaker variations, where the spectral slope can be considered as a lower-order component of the spectral bias. Note that the bias model also holds for cepstrum coefficients due to their linear relation to the logarithmic spectra, and the dynamic spectra features are not affected by spectral bias due to their inherent computation of spectra differences.

Estimation of Spectral Bias

To take into account speaker pronunciation variations, an unsupervised algorithm is preferred in estimating spectral bias to avoid forced alignments of phone units. An unsupervised maximum likelihood algorithm was previously formulated in S. J. Cox and J. S. Bridle, "Unsupervised Speaker Adaptation by Probabilistic Fitting," *Proc. ICASSP*, pp. 294–297, Glasgow, Scotland, May 1989, where spectral biases were estimated for speaker adaptation in isolated vowel and word recognition. This formulation is adopted in the present embodiment and is extended to methods of acoustic normalization for speaker-independent continuous speech recognition.

The statistical models of the standard speaker are taken as unimodel Gaussian density phone models. Let the Gaussian densities be $N(\mu_i, C_i)$, denoted by the labels $m_i, i=1,2,\ldots,M$. Let $p(\tilde{x}_t^{(q)}, m_i | h^{(q)})$ denote the likelihood function of the normalized spectra $\tilde{x}_t^{(q)} = x_t^{(q)} - h^{(q)}$ and its label $m_i$, given the spectral bias $h^{(q)}$, for $t=1,2,\ldots,T^{(q)}$. The objective function J for estimating $h^{(q)}$ is defined as $$J = \prod_{t=1}^{T^{(q)}} \sum_{i=1}^{M} p(\tilde{x}_t^{(q)} | m_i, h^{(q)}) p(m_i | h^{(q)})$$

where $p(m_i | h^{(q)})$ is assumed as uniform and $p(\tilde{x}_t^{(q)} | m_i, h^{(q)}) \sim N(\mu_i, C_i)$. Denoting the posterior probability $p(m_i | \tilde{x}_t^{(q)}, h^{(q)})$ by $a_{i,t}$, the estimate $\hat{h}^{(q)}$ maximizing J is then obtained as $$\hat{h}^{(q)} = \left( \sum_{t=1}^{T^{(q)}} \sum_{i=1}^{M} a_{i,t} C_i^{-1} \right)^{-1} \sum_{t=1}^{T^{(q)}} \sum_{i=1}^{M} a_{i,t} C_i^{-1} (x_t^{(q)} - \mu_i)$$

A rigorous estimation of $\hat{h}^{(q)}$ can be performed iteratively until convergence by using $\hat{h}_n^{(q)}$ in computing the probabilities on the right-hand side of the equation to obtain $\hat{h}_{n+1}^{(q)}$, where $\hat{h}_o^{(q)}=0$. Experiments showed that using one-step and iterative estimates of $\hat{h}^{(q)}$ led to similar improvements of recognition performance; using diagonal and identity covariance matrices yielded similar results, but using full covariance matrices produced inferior results possibly due to unreliable estimates of the matrices. For saving of computations, the posterior probability is replaced by the decision function $$p(m_i | \tilde{x}_t^{(q)}, h^{(q)}) = \begin{cases} 1 & \text{if } i = \arg\max_{i'} p(m_{i'} | \tilde{x}_t^{(q)}, h^{(q)}) \\ 0 & \text{otherwise,} \end{cases}$$

and only one-step estimation is made with the covariance matrices fixed as identity matrices.

Normalization Methods

Figure 2A:
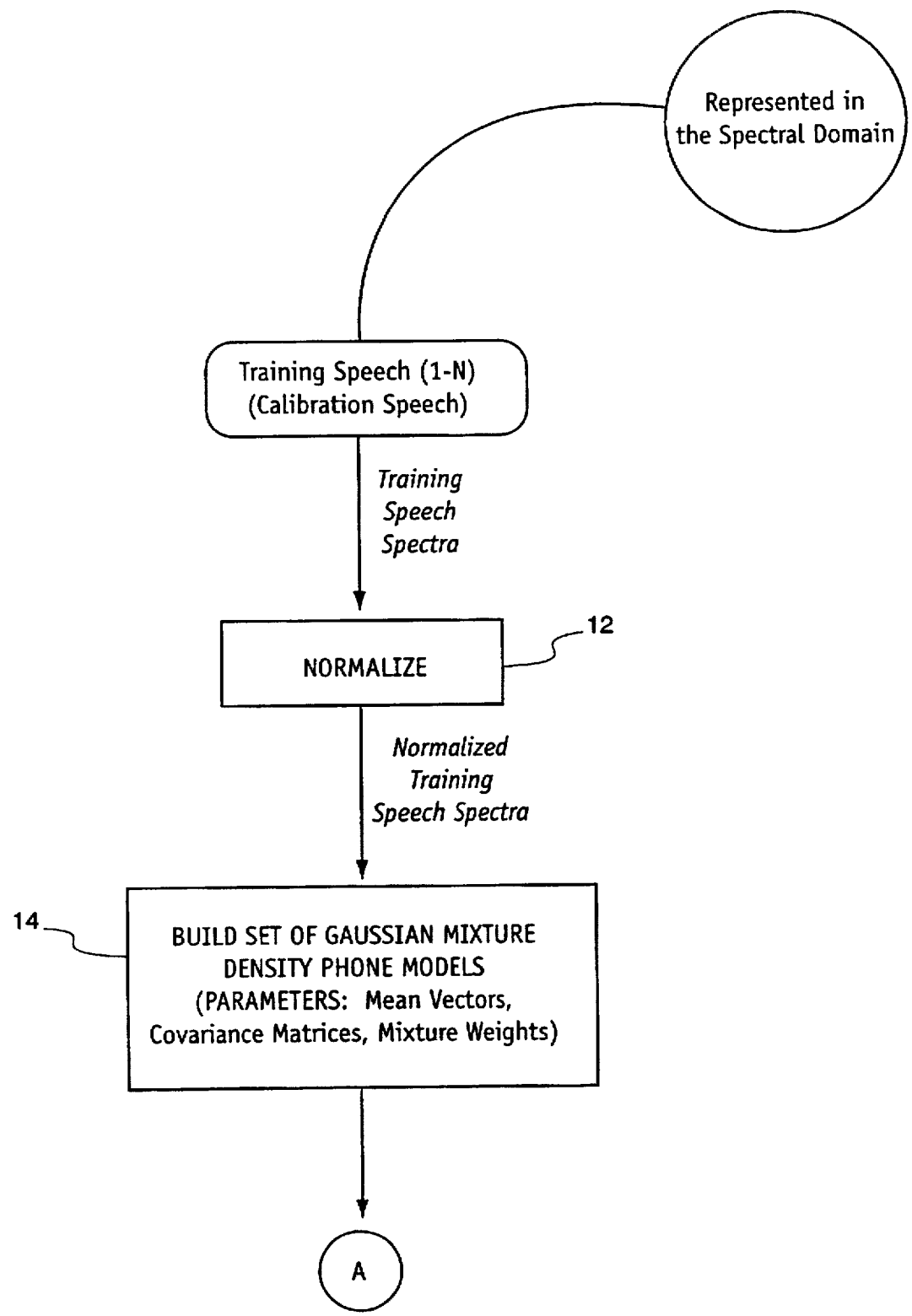
FIGS. 2a–2c illustrate the speech recognition method accoding to the principles of the present invention.
Figure 2B:
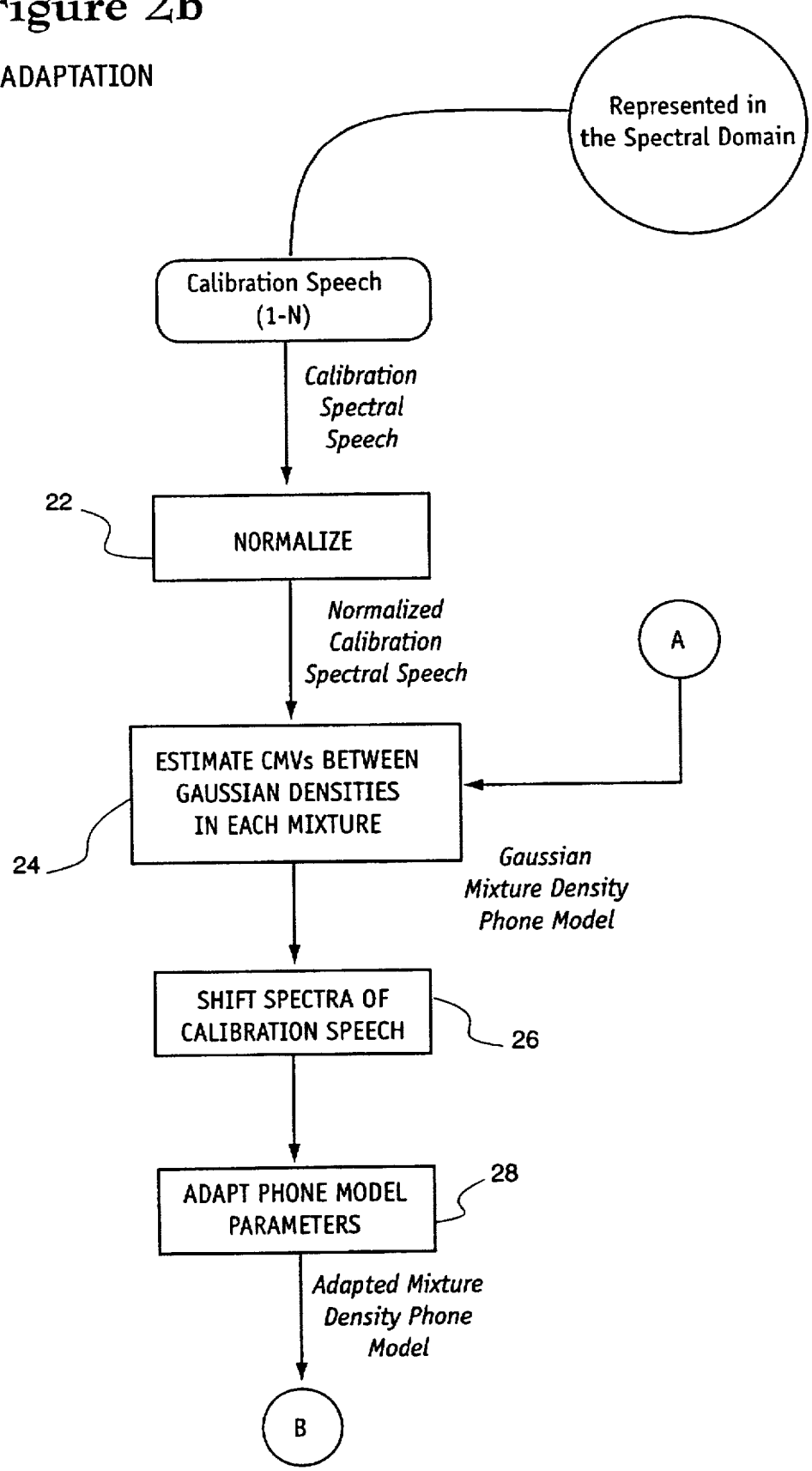
Figure 2C:
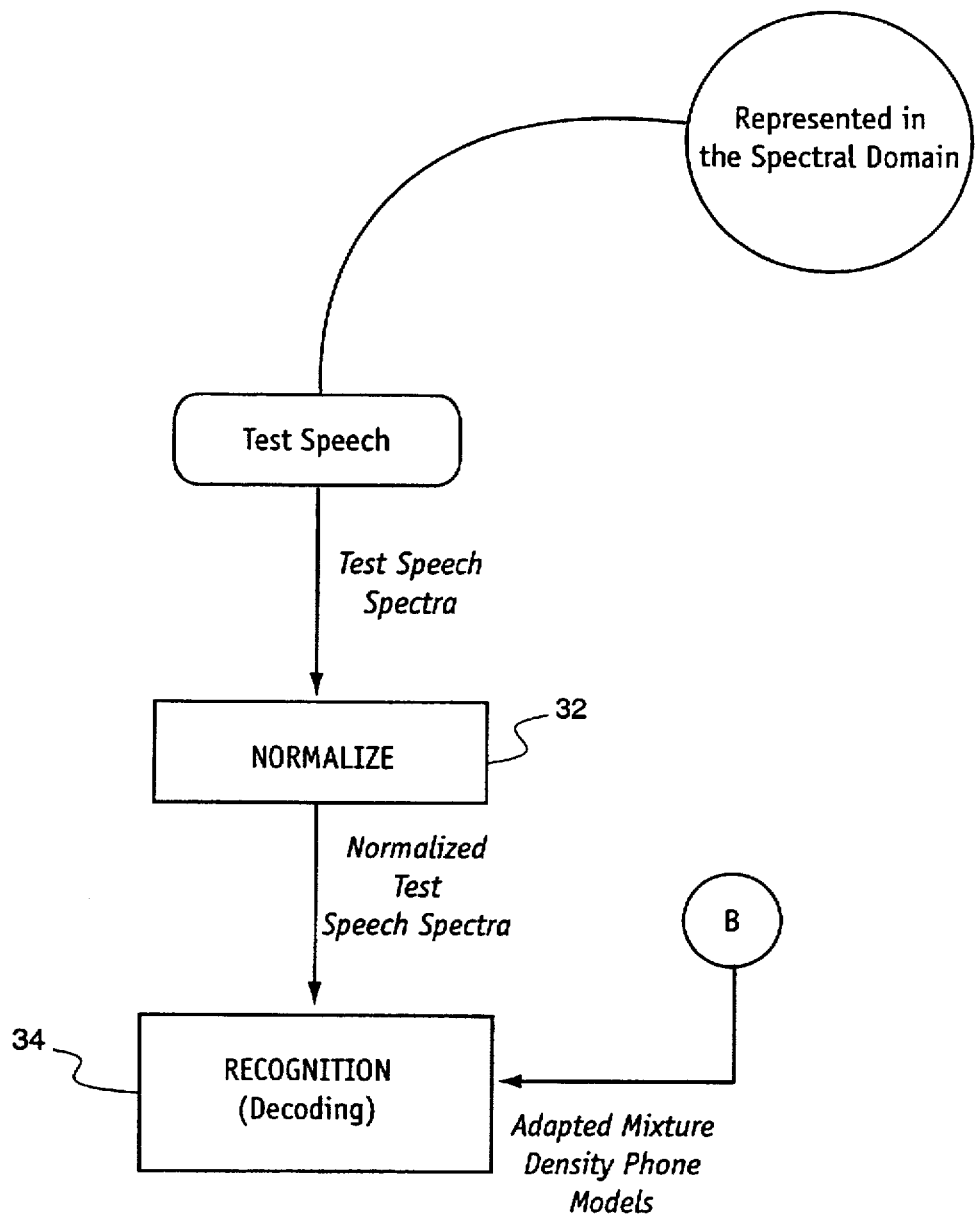

In training mixture density phone models from limited continuous speech data, it is difficult to obtain truly speaker-independent parameters for each density since its parameters are biased by the speaker subset contributing the training data. Removing the spectral biases from the training spectra can therefore make the phone models more efficient in capturing statistical variations of allophones. For this reason, acoustic normalizations are performed on both the training and test speech spectra at steps 12, 22 and 32. Each speaker contributes a short passage of calibration speech, where by "calibration speech" an identical text content is implied. The calibration data of the training speakers are used in FIG. 2b to train the statistical models of the standard speaker, and the spectral biases are then estimated for individual speakers. The mixture density phone models are trained at step 14 using the acoustically normalized training data from step 12, and the test data are acoustically normalized at step 32 before decoding. In the experiments described below, an experiment is also conducted by normalizing only the test speech to relieve the need for calibration speech.

Phone Model Adaptation

The phonologic characteristics of speakers introduce inter-speaker spectra variations at the level of phone units. For adapting the phone model parameters for each speaker, difficulty arises as to how a large inventory of means vectors can be adapted by the spectra from a short passage of calibration speech. The context modulation model is formulated for efficiently using the adaptation data, where the allophone spectra in the calibration speech are related to those in the training speech for extending the former to the latter. The sample mean vectors are estimated for each speaker from such extended allophone spectra, and the mean vectors of the mixture Gaussian densities are adapted via Bayesian estimation. Bayesian estimation has previously been used for speaker adaptation of mixture Gaussian density parameters in C. H. Lee et al., "A Study on Speaker Adaptation of Continuous Density HMM Parameters," *Proc. ICASSP*, pp. 145–148, Albuq., N.M., April 1990 and B. Necioglu et al., "A Bayesian Approach to Speaker Adaptation for the Stochastic Segment Model," *Proc. ICASSP*, pp. 1437–1440, San Francisco, Calif., March 1992.

The Context Modulation Model

A context modulation on an allophone is assumed to modify its spectra on the linear order and the relation between the logarithmic spectra of two allophones $\alpha$ and $\beta$ is therefore $x_{\alpha,t} = x_{\beta,t} + \gamma$, where $\gamma$ is called the context modulation vector (CMV) determined at step 24.

For a training speaker q, let the allophone subsegments in the calibration speech tied to one state of a phone unit be $x^{(q)} = \{x_1^{(q)}, x_2^{(q)}, \ldots, x_N^{(q)}\}$ where the subsegments are obtained from Viterbi segmentation and each phone unit has three states. Assuming Q speakers in the training set, the identically indexed allophone subsegments are pooled into their respective sets as $X_j\{x_j^{(q)}, q=1,2,\ldots,Q\}, j=1,2,\ldots,N$. On the other hand, each mixture component of the mixture density of the state contains a set of allophone subsegments of similar contexts, since after acoustic normalization (step 22) the mixture components mainly model contextual variations of allophones. Denote the set of allophone subsegments in a mixture component by $$Y = \{y_1^{(q1)}, y_2^{(q2)}, \ldots, y_K^{(qK)}\}, \text{ where } y_k^{(qk)}$$

is the kth subsegment in Y from speaker qk. The CMVs are estimated between $X_j$ and Y, with $j=1,2,\ldots,N$, and Y represents each mixture component in turn.

To estimate the CMV $\gamma_j$ between $X_j$ and Y (step 24), each $y_k^{(qk)} \in Y$ is paired with an $x_j^{(qk)} \in X_j$ (same speaker), $k=1,2, \ldots, K$ for minimizing residue speaker factors in the estimation of CMVs. The spectra distribution within the allophone subsegment $y_k^{(qk)}$ can be modeled by Gaussian density $N(\mu_k, C_k)$ where $C_k$ is taken as an identity matrix I since an allophone subsegment is usually too short to reliably estimate the parameters of $C_k$. Define the context modulated spectra of $x_j^{(qh)}$ to Y as $\tilde{x}_{j,t}^{(qh)} = x_{j,t}^{(qh)} - \gamma_j$ where $\tilde{x}_{j,t}^{(qh)} \sim N(\mu_k, C_k)$, for $t=1,2,\ldots, T_j^{(qh)}$. The objective function for estimating $\gamma_j$ is then taken as the joint likelihood function $$J = \prod_{k=1}^{K} \left( \prod_{t=1}^{T_j^{(qh)}} p(\tilde{x}_{j,t}^{(qh)} | y_{j,t}(\mu_k, I)) \right)$$

Solving for $d\log J/d\gamma_j = 0$ the estimate of $\gamma_j$ is obtained as $$\hat{\gamma}_j = \sum_{k=1}^{K} \omega_k \hat{\gamma}_j^{(qh)}$$

where $$\hat{\gamma}_j^{(qh)} = \frac{1}{T_j^{(qk)}} \sum_{t=1}^{T_j^{(qk)}} x_{j,t}^{(qk)} - \mu_k$$

which is the difference between the centroids of the two subsegments $x_j^{(qk)}$ and $y_k^{(qk)}$ and $$\omega_k = T_j^{(qk)} \left/ \sum_{k=1}^{K} T_j^{(qk)} \right.$$

For a test speaker q, the spectra of the allophone subsegment $x_j^{(q)}$ in the calibration speech are shifted at step 26 by $\hat{\gamma}_j$ into the context environment defined by the mixture component Y, i.e.

$$\tilde{z}_{j,t}^{(q)} = z_{j,t}^{(q)} - \hat{\gamma}_j, \, t=1,2, \ldots T_j^{(q)}.$$

Such spectra shifts (step 26) are performed on every allophone subsegment of the calibration speech with respect to every mixture component of the corresponding state and phone unit.

Adaptation of the Mean Vectors

The shifted allophone spectra for a mixture component are used to adapt its mean vector at step 28. The adaptation follows Bayesian estimation where the adapted mean vector is the posterior estimate and the speaker independent mean vector is the prior estimate. Denote the adapted and the original mean vectors of the mixture component by $\hat{\mu}^{(q)}$ and $\mu_o$, respectively, and let the sample mean vector estimated from the corresponding set of shifted spectra be $\hat{\mu}_z^{(q)}$. The interpolation formula is defined as $$\hat{\mu}^{(q)} = \Lambda \hat{\mu}_z^{(q)} + (I - \Lambda) \mu_o$$

where $\Lambda = \text{diag}(\lambda_1, \lambda_2, \ldots, \lambda_{L+1})$ with L+1 being the feature dimension. From Bayesian estimation, the interpolation parameters are $$\lambda_i = \frac{n \sigma_{o,i}^2}{\sigma_i^2 + n \sigma_{o,i}^2}$$

for $i=1,2,\ldots,L+1$ where n is the adaptation sample size, the $\sigma_i^2$'s are the variance terms of the mixture component Gaussian density, and the $\sigma_{o,i}^2$'s are the variance terms of the prior Gaussian density of the mean. Since the $\sigma_{o,i}^2$'s are unknown, they are approximated by the average variances of the subsegments in the mixture component. Let the sample variances of the subsegments of the set be $\{v_{1,i}^2, v_{2,i}^2, \ldots v_{K,i}^2, i=1,2,\ldots, L+1\}$ and their sample size be $\{n_1, n_2, \ldots n_K\}$. The prior variance terms are then estimated as $$\hat{\sigma}_{o,i}^2 = \sum_{k=1}^{K} p_k v_{k,i}^2, \, i=1,2,\ldots, L+1$$

where $$p_k = n_k \left/ \sum_{k'=1}^{K} n_{k'} \right.$$

The adaptation performance on speaker-independent models is found to be sensitive to the degree of adaptation which is determined by the values of the interpolation parameters $\lambda_i$'s. If, for a mixture component, the adapatation data (size N) is used together with the original training data (size N) to re-estimate the mean vector, i t can be determined that $\lambda_i=n/(n+N)$, which is usually quite small. In Bayesian estimation, the value of $\lambda_i$'s could be much larger than the sample size proportion due to the gain from the prior statistics. However, these statistics are approximated from limited training data and are therefore subjected to estimation errors. An over-adaptation could degrade performance when the adaptation data contain errors caused by segmentation or context modulation. A practical method used in the current work is to skip adaptation when the sample size is too small (n=1) where the sample mean is unreliable and to constrain the $\lambda_i$'s by an upper limit $\alpha<1$.

Experiments

Experiments were performed on the TIMIT database and speech data collected in our laboratory (STL). The speaker-independent HMM phone models were trained from 325 speakers and 717 sentences from the TIMIT database, where the training data cover 60 acoustic-phonetic labels defined in the TIMIT. The speech data was down-sampled from 16 kHz to 10.67 kHz. The cepstrum coefficients of PLP analysis of log energy were used as instantaneous features, and their first-order temporal regression coefficients as dynamic features. The analysis window size was 200 samples with a shift of 100 samples. The recognition performance was evaluated using the scoring routine of NIST. The two calibration sentences in the TIMIT database (SA1 and SA2) were used as adaptation speech which contained 21 short words, 65 phone segments and 33 phonetic labels (cover about half the phone units). The average duration of the two sentences was approximately 5 seconds per speaker.

The vocabulary size of recognition was 853 and the grammar perplexities were 104 and 101 for the TIMIT and STL test sets, respectively.

The TIMIT test set had 75 speakers with 50 males and 25 females; there were 186 test sentences which averaged 2.5 sentences per speaker. The STL test set had five speakers with three males and two females, where each speaker spoke 28 TIMIT test sentences. Compared to the TIMIT data, STL data was collected using the same Sennheiser close-talking microphone but under a higher level of ambient noise, and the filter characteristics are also not well matched.

Experiments on Acoustic Normalization

Figure 1B:
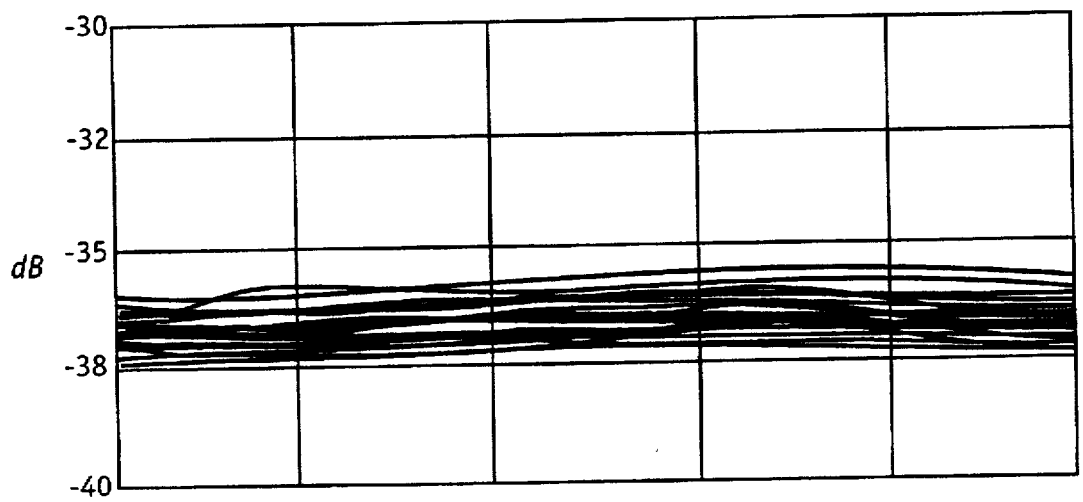
FIG. 1b is a similar graph showing the spectral biases after normalization, illustrating the improvement afforded by the present invention.

To visualize the spectral biases contributed by speaker articulatory characteristics, the log spectra of the estimated $h^{(q)}$'s are plotted in FIG. 1a for speakers in the TIMIT test set. Wide variations of spectral biases are observed among the speakers. After normalization (step 32), the standard speaker models were retrained, and the spectral biases were re-estimated for the test speakers. The log spectra of these new $h^{(q)}$'s are shown in FIG. 1b where the spectral biases were basically removed.

The performance of speaker-independent recognition (baseline) (step 34) and using three methods of acoustic normalization (step 32) are shown in Table 1: in norm-1, calibration speech were used in estimating the spectral biases for both training and test speakers and the phone models were trained from the normalized spectra; in norm-2 the baseline speaker-independent phone models were used for decoding and from each test sentence a spectral bias was estimated; norm-3 was similar to norm-2 but the spectral bias was estimated from the speaker's test sentences cumulatively, i.e. as each new test sentence from the speaker became available, the spectral bias was updated from the enlarged data set. From the table, normalization on both training (step 12) and test (step 32) spectra gave the best results; using cumulated data improved the estimation of the spectral biases. The significant improvements on the STL test set illustrate the effectiveness of the acoustic normalization for unmatched recording conditions.

TABLE 1

|  | baseline | norm-1 | norm-2 | norm-3 |
|---|---|---|---|---|
| TIMIT | 86.9% | 88.8% | 87.1% | 88.1% |
| STL | 65.4% | 83.7% | 81.8% | 83.1% |

Experiments on Phone Model Adaptation

The adaptation of phone model parameters was performed only on the mean vectors of the Gaussian densities which model the instantaneous spectra features, and the model parameter of the dynamic features were not affected. Three cases were considered for the interpolation parameters: in adap-1 the $\lambda_i$'s were estimated as in step 28; in adap-2 the variance terms $\sigma_i^2$'s were averaged by the sample variance terms $\delta_i^2$'s of the adaptation data around $\mu_o$ such that $$\bar{\sigma}_i^2 = \frac{n}{n+N} \delta_i^2 + \frac{N}{n+N} \sigma_i^2$$

and the $\sigma_i^2$'s were used in calculating the $\lambda_i$'s in adap-3, the variance terms $\sigma_i^2$ and $\sigma_{o,i}^2$ were set equal. The recognition accuracies are shown in Table 2, where the upper limit $\alpha$ on the $\lambda_i$'s was varied from 0.4 down to 0.2. As seen from the Table, limiting the $\lambda_i$'s by $\alpha=0.3$ gave the best results for all three cases and adap-2 appears to yield smaller variation of performance with $\alpha$ than the other two methods. Compared to the baseline, the decoding word accuracies achieved by adap-2 (step 34) at $\alpha=0.3$ amount to 28.2% and 58.1% error reductions for the TIMIT and STL test sets, respectively.

To compare the current adaptation technique with other methods, three additional experiments were conducted and the results are summarized in Table 3. In the Table, the direct adaptation method used adap-2 at $\alpha=0.3$ as in Table 2 but did not precondition speech spectra by acoustic normalization; the retraining method calculated the $\lambda_i$'s by the sample size proportion as discussed with respect to step 28; the clustering method did not use CMVs, instead, the adaptation data were clustered around the mean vectors, and the mean vectors were adapted using the respective clustered data set via Bayesian estimation. As seen, none of the methods in Table 3 achieved as much improvement of recognition accuracy as the Bayesian methods (using $\alpha$) in Table 2. On the other hand, to relieve the need for heuristic limit $\alpha$, improvements to the estimation of the variance statistics used in Bayesian estimation are needed, and better methods of identifying unreliable adaptation samples are also desirable.

TABLE 2

|  |  | $\alpha = 0.4$ | $\alpha = 0.3$ | $\alpha = 0.2$ |
|---|---|---|---|---|
| adap-1 | TIMIT | 90.1% | 90.6% | 90.1% |
|  | STL | 85.4% | 85.7% | 84.8% |
| adap-2 | TIMIT | 90.3% | 90.6% | 90.0% |
|  | STL | 85.3% | 85.5% | 84.8% |
| adap-3 | TIMIT | 89.7% | 90.5% | 90.1% |
|  | STL | 84.4% | 85.3% | 85.0% |

TABLE 3

|      | Direct Adap. | Retraining | Clustering |
|------|--------------|------------|------------|
| TIMIT | 87.7%       | 89.7%      | 89.0%      |
| STL  | 66.1%        | 83.8%      | 83.7%      |

Conclusion

The speaker adaptation technique developed in the current work has led to significant performance improvements over the baseline by using very short calibration speech. The technique is especially effective for "outlier" speakers and recording condition mismatches. Further improvements of recognition performance are expected through improving the estimation of speech statistics used in Bayesian estimation and identifying additional variation sources such as speech dynamics for adaptation.

I claim:

1. A speech recognition method comprising the steps of:
   a. providing training speech that includes a passage of calibration speech for each training speaker;
   b. representing the training speech in a spectral domain such that each training speech utterance is represented by a sequence of training speech spectra;
   c. building a first set of Gaussian density phone models from the spectra of all calibration speech;
   d. estimating a spectral bias indicative of speaker acoustic characteristics for each calibration speech using said first set of Gaussian density phone models;
   e. normalizing the training speech spectra based on speaker acoustic characteristics using said spectral bias;
   f. building a second set of Gaussian mixture density phone models having parameters of mean vectors, covariance matrices and mixture weights from said normalized training speech spectra;
   g. taking a passage of calibration speech from each speaker;
   h. representing the calibration speech in a spectral domain such that each calibration speech utterance is represented by a sequence of speech spectra;
   i. estimating a spectral bias indicative of speaker acoustic characteristics for each calibration speech using said second set of Gaussian mixture density phone models built in step f;
   j. normalizing the calibration speech spectra based on speaker acoustic characteristics using said spectral bias;
   k. adapting the phone model parameters based on speaker phonologic characteristics using the normalized calibration speech, where context modulation vectors are estimated between Gaussian densities in each mixture, and the context modulation vectors are used to shift the spectra of the calibration speech;
   l. providing test speech for speech recognition;
   m. representing the test speech in a spectral domain such that the test speech is represented by a sequence of test speech spectra;
   n. normalizing the test speech spectra based on speaker acoustic characteristics using said spectral bias;
   o. using the normalized test speech spectra in conjunction with the adapted Gaussian mixture density phone models to recognize the test speech.

2. The method of claim 1 wherein the step of providing training speech is performed by providing sample speech from a plurality of persons that includes calibration speech consisting of the same predefined set of words.

3. The method of claim 2 wherein the predefined set of words is uttered in continuous speech fashion.

4. The method of claim 1 wherein said step of representing the training speech in a spectral domain comprises extracting PLP cepstrum coefficients indicative of phonetic features of the speech.

5. The method of claim 1 wherein said step of representing the training speech in a spectral domain comprises extracting first-order temporal regression coefficients to represent dynamic features of the speech.

6. The method of claim 1 wherein said normalizing steps are performed by estimating the spectral deviation vector and subsequently removing said vector from the speech spectra.

7. The method of claim 1 wherein the step of normalizing the training speech spectra is performed by estimating the parameters of unimodel Gaussian density phone models.

8. The method of claim 7 further comprising using said phone models to estimate the spectral deviation vector for each of the speakers and subsequently removing said vector from the speech spectra for each of the speakers.

9. The method of claim 1 wherein the step of normalizing the training speech spectra is performed by:
   (1) generating a set of unimodal Gaussian density phone models from the calibration speech; and
   (2) using said set of unimodal Gaussian density phone models to estimate the spectral deviation vector for each of the speakers and subsequently removing said spectral deviation vector from the speech spectra for each of the speakers.

10. The method of claim 1 wherein the step of adapting the phone model parameters is performed by modifying the Gaussian mixture density parameters based on context-modulated acoustically normalized calibration speech from a specific speaker.

11. The method of claim 10 wherein the context-modulated calibration speech is generated by subtracting context modulation vectors from the calibration speech of said specific speaker.

12. The method of claim 11 wherein said context modulation vectors are estimated based on training data from a plurality of training speakers and said Gaussian mixture density phone model.

13. The method of claim 11 wherein said subtracting comprises subtracting a context modulation vector from a segment of a phone unit in the calibration speech of said specific speaker for each Gaussian density in the Gaussian mixture density for the state of the phone unit.

14. The method of claim 13 wherein the phone unit segment is obtained by an automatic segmentation of the calibration speech of the specific speaker.

15. The method of claim 13 wherein the phone unit segment is obtained by Viterbi segmentation of the calibration speech of the specific speaker.

16. The method of claim 10 wherein said step of modifying the Gaussian mixture density parameters is performed by Bayesian estimation.

* * * * *